United States Patent
Balan et al.

(10) Patent No.: US 10,740,924 B2
(45) Date of Patent: Aug. 11, 2020

(54) TRACKING POSE OF HANDHELD OBJECT

(71) Applicant: Microsoft Technology Licensing, LLC, Redmond, WA (US)

(72) Inventors: Alexandru Octavian Balan, Sammamish, WA (US); Yogeshwar Narayanan Nagaraj, Redmond, WA (US); Constantin Dulu, Bothell, WA (US); William Guyman, Medina, WA (US); Ivan Razumenic, Belgrade (RS)

(73) Assignee: Microsoft Technology Licensing, LLC, Redmond, WA (US)

( * ) Notice: Subject to any disclaimer, the term of this patent is extended or adjusted under 35 U.S.C. 154(b) by 39 days.

(21) Appl. No.: 15/954,362

(22) Filed: Apr. 16, 2018

(65) Prior Publication Data

US 2019/0318501 A1    Oct. 17, 2019

(51) Int. Cl.
| | |
|---|---|
| *G06T 7/73* | (2017.01) |
| *G06F 3/0346* | (2013.01) |
| *G06T 7/246* | (2017.01) |
| *A63F 13/235* | (2014.01) |
| *A63F 13/212* | (2014.01) |
| *A63F 13/211* | (2014.01) |
| *A63F 13/92* | (2014.01) |

(52) U.S. Cl.
CPC .............. *G06T 7/74* (2017.01); *A63F 13/211* (2014.09); *A63F 13/212* (2014.09); *A63F 13/235* (2014.09); *A63F 13/92* (2014.09); *G06F 3/0346* (2013.01); *G06T 7/248* (2017.01); *A63F 2300/405* (2013.01)

(58) Field of Classification Search
CPC .... G06F 3/0346; G06F 3/04815; G06F 3/033; G06F 3/0325; G06F 3/017; G06F 3/011; G06F 2203/0382; G06F 3/0308; G06F 3/038
See application file for complete search history.

(56) References Cited

U.S. PATENT DOCUMENTS

| | | | |
|---|---|---|---|
| 2010/0225582 A1* | 9/2010 | Ohta ...................... | A63F 13/02 345/158 |
| 2016/0054797 A1* | 2/2016 | Tokubo .................. | G06F 3/041 345/633 |
| 2016/0364910 A1* | 12/2016 | Higgins ................ | A63F 13/235 |
| 2016/0378204 A1* | 12/2016 | Chen ....................... | G01C 3/08 345/156 |
| 2017/0003765 A1* | 1/2017 | Shedletsky ............. | G06F 1/163 |
| 2018/0101247 A1* | 4/2018 | Lee ......................... | G06F 3/011 |

* cited by examiner

*Primary Examiner* — Md Saiful A Siddiqui
(74) *Attorney, Agent, or Firm* — Alleman Hall Creasman & Tuttle LLP

(57) ABSTRACT

Examples are disclosed that relate to tracking a pose of a handheld object used with a head-mounted display device. In one example, a method comprises: receiving image data from an image sensing system; detecting a plurality of feature points of the handheld object in a frame of the image data; receiving inertial measurement unit (IMU) data from an IMU of the handheld object; based on detecting the plurality of feature points and receiving the IMU data, determining a first pose of the handheld object; determining that at least a portion of the plurality of feature points is not detected in another frame of the image data; using the IMU data, updating the first pose of the handheld object to a second pose; and body-locking the second pose of the handheld object to a body location on a user wearing the head-mounted display device.

20 Claims, 11 Drawing Sheets

TRACKING POSE OF HANDHELD OBJECT

BACKGROUND

Motion may be tracked as computing device input via data from various sensors, such as image sensors and inertial sensors.

SUMMARY

One disclosed example provides a method at a computing device for tracking a pose of a handheld object used with a head-mounted display device. The method comprises receiving image data from an image sensing system, detecting a plurality of feature points of the handheld object in a frame of the image data, and receiving inertial measurement unit (IMU) data from an IMU of the handheld object. Based on detecting the plurality of feature points and receiving the IMU data, a first pose of the handheld object is determined. The method then determines that at least a portion of the plurality of feature points is not detected in another frame of the image data. Using the IMU data, the first pose of the handheld object is updated to a second pose, and the second pose of the handheld object is body-locked to a body location on a user wearing the head-mounted display device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

This application discloses examples related to computing systems comprising head-mounted display devices (HMDs) that interface with handheld controllers and/or other handheld peripheral objects, e.g. as parts of a gaming system. To make a gaming experience more immersive, the poses of a HMD and a handheld controller may be tracked as the devices are moved through space by a user to provide inputs to control a user interface of the HMD. Such pose tracking also may be used for computing device interactions other than gaming.

The disclosed examples may utilize cameras, such as a stereo camera arrangement, on the HMD for tracking a handheld object, such as a game controller. This avoids the use of external light sources and/or cameras placed elsewhere in the surrounding environment for tracking of the handheld controller, which would have to be set up in the use environment prior to use. In other examples, the disclosed methods may use external image sensing systems, such as cameras mounted in the surrounding environment, to track one or more handheld controllers used with the HMD.

In some examples and as described in more detail below, visually tracking the pose of a handheld object may be hindered or rendered impossible when the object moves partially or completely out of view of the tracking camera(s). While a pose of the object may be estimated using other data, such as orientation data received from the object, such non-visual estimates may quickly grow increasingly inaccurate over time. Accordingly, and as described below, the present disclosure presents methods and techniques for tracking the pose of a handheld object when visual tracking of the object is impaired or unavailable, while also preventing unrealistic drift.

Figure 1:
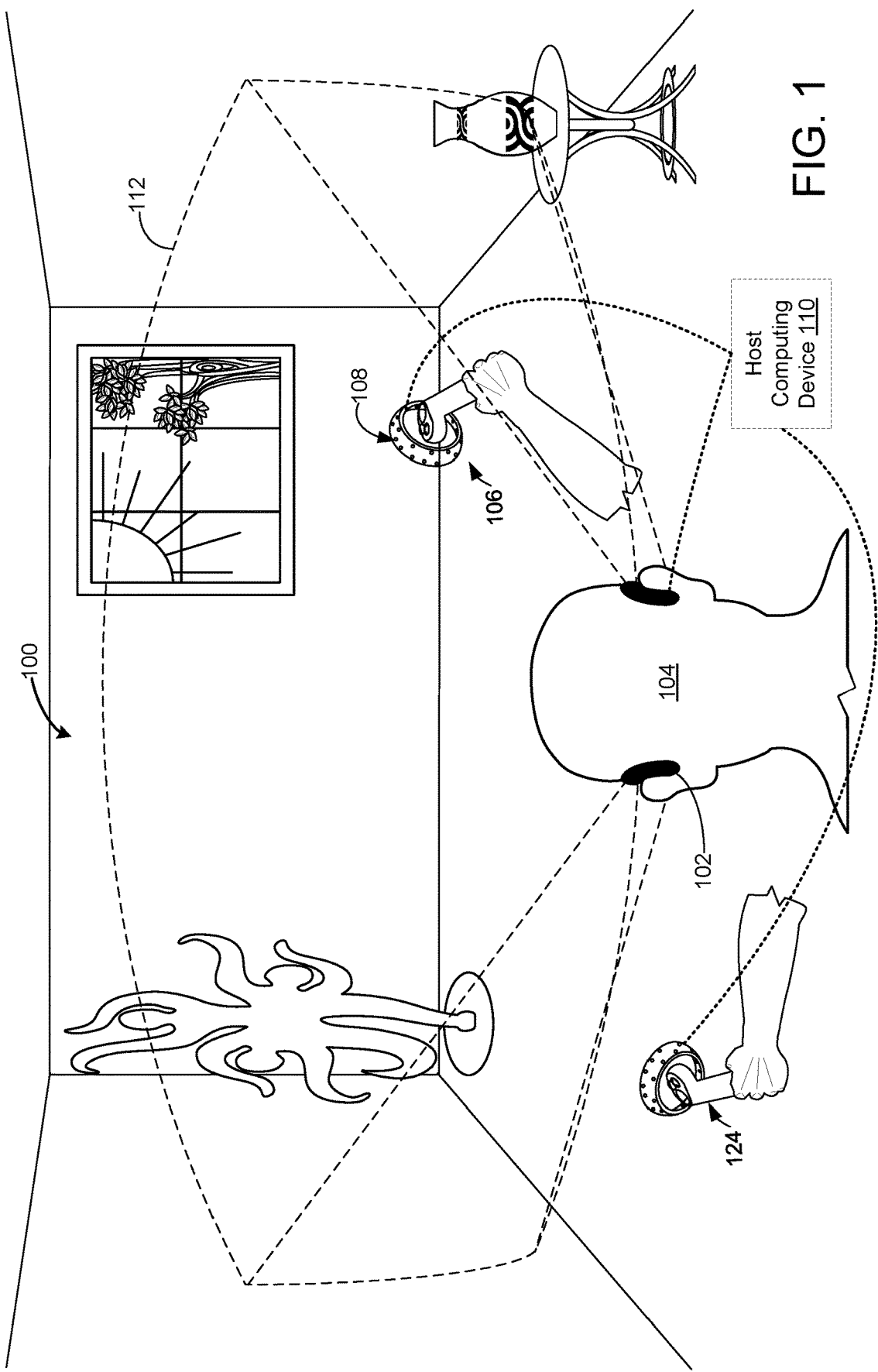
FIG. 1 shows an example use scenario in which poses of a handheld object may be tracked as computing device input.
Figure 2:
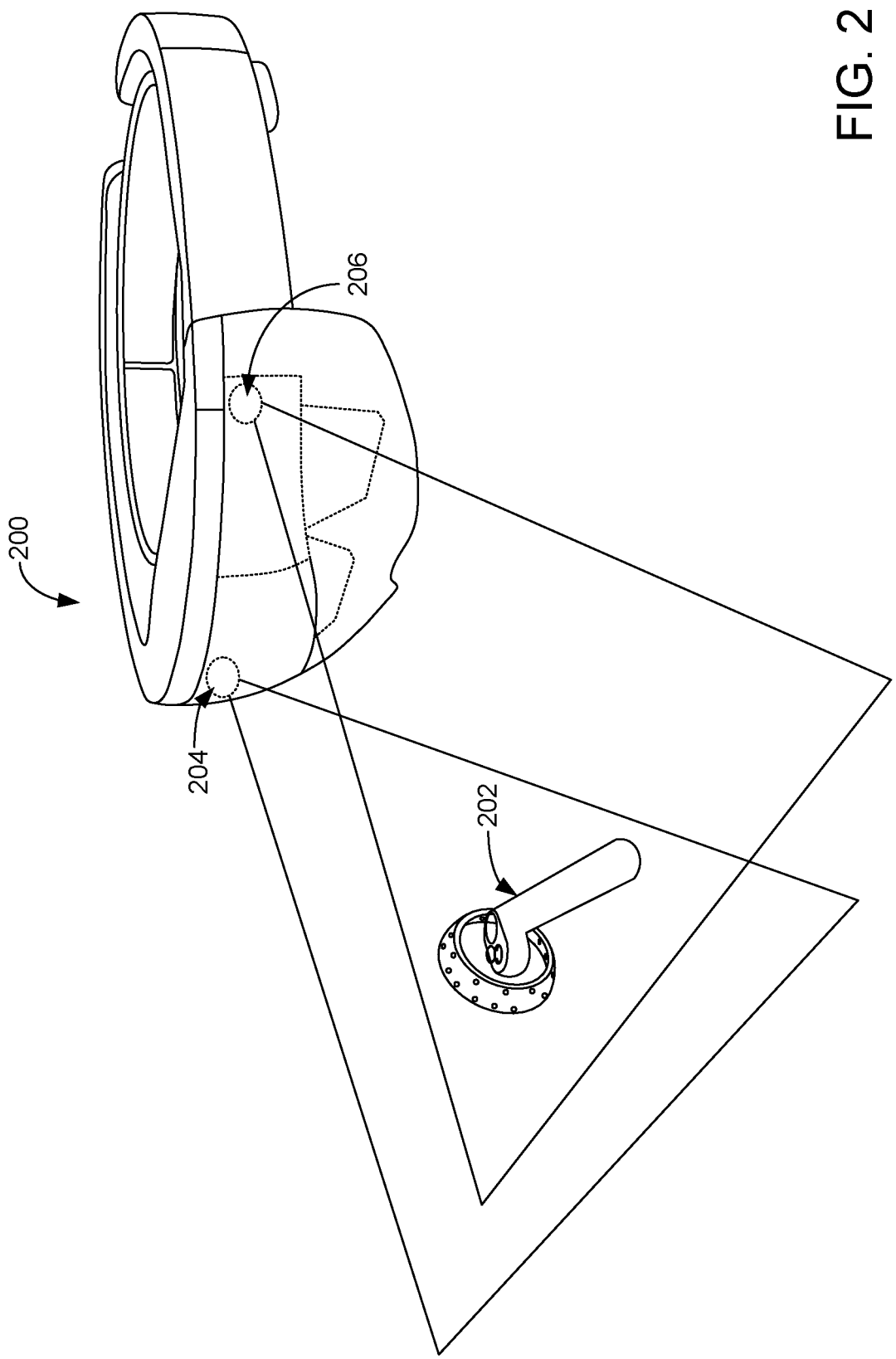
FIG. 2 shows an example wearable device imaging a handheld object.

FIG. 1 shows an example scenario 100 in which a HMD 102, worn by a user 104, displays virtual and/or augmented reality imagery. One or more outward-facing cameras on the HMD 102 may acquire image data (e.g. visible light image data) of the surrounding environment and of a handheld object 106 held by the user 102. For example, FIG. 2 shows an example HMD 200 imaging a handheld object 202 using a stereo camera imaging system (indicated by first camera 204 and second camera 206). Returning to FIG. 1, the cameras or other image sensing systems of the HMD 102 may have an associated field of view 112 in which the handheld object 106 may be imaged. FIG. 1 also depicts a second handheld object 124 held by the other hand of user 102 outside the field of view 112, where the handheld object 124 cannot be imaged by the image sensing systems of the HMD 102.

In the examples disclosed herein, the term "handheld object" is used for an object that may be held by hand and comprises feature points in the form of trackable light sources 108, and signifies that the object may be handheld, whether or not the object is currently in the state of being held in a hand. While the disclosed examples of handheld objects utilize feature points in the form of trackable light sources, other examples of handheld objects may utilize other forms of feature points, where such feature points may include markers, patterns and/or other fiducials that may be visually tracked.

The handheld object 106 is depicted as a controller, for example, for a video game system. The handheld object 106 may, in some examples, include an onboard processor, storage system, and communication system. In other examples, the handheld object may not include one or more such systems, but may include lights or other identifiable feature points to assist in optical tracking of the handheld object. The handheld object 106 may also include one or more input controls, such as a button, trigger, joystick, directional pad, touch screen, etc. The handheld object 106 comprises an inertial measurement unit (IMU) (which may include an accelerometer, gyroscope, magnetometer, and/or other suitable sensors) that provides output related to changes in position and orientation of the handheld object 106. In some examples, the HMD 102 may also include an IMU to help track changes in the HMD pose in the environment.

Figure 3:
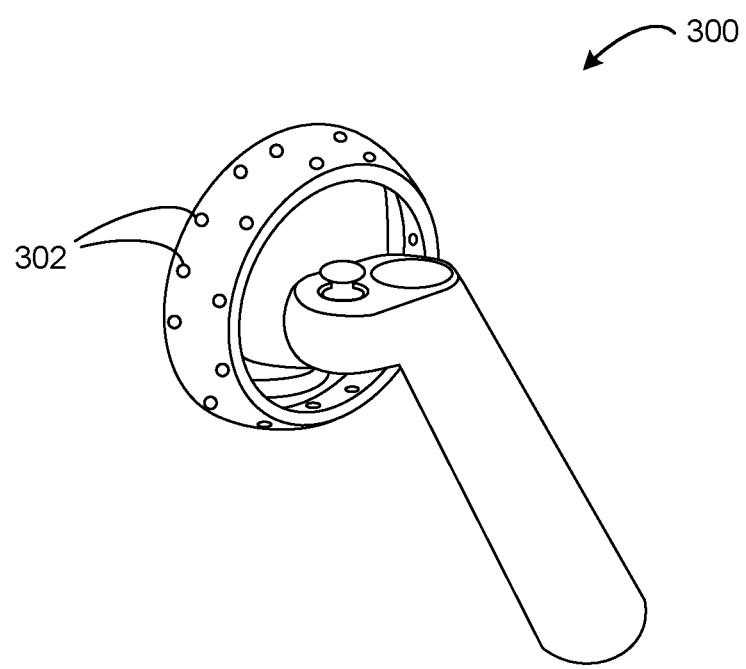
FIG. 3 shows a view of an example handheld object.

In the examples described herein, the handheld object includes feature points in the form of a plurality of light sources distributed over a surface of the handheld object. FIG. 3 shows an example handheld object 300 having a plurality of light sources 302 distributed along both an exterior and interior of a ring-like structure of the handheld controller 300. The light sources are configured to form patterns of light ("constellations") in image data acquired by an image sensing system, such as one or more cameras of the HMD, such that a pose of the handheld object may be determined from an image capturing the controller. The light sources may take any suitable form, such as light-emitting diodes (LEDs) that emit visible light for detection via a visible light camera or cameras on the HMD. Infrared light sources also may be used. In some examples, the camera(s) on the HMD may be configured to filter wavelengths of light other than those emitted by the LEDs to reduce noise levels in the image data. A handheld object may have any suitable number and arrangement of light sources.

Figure 4:
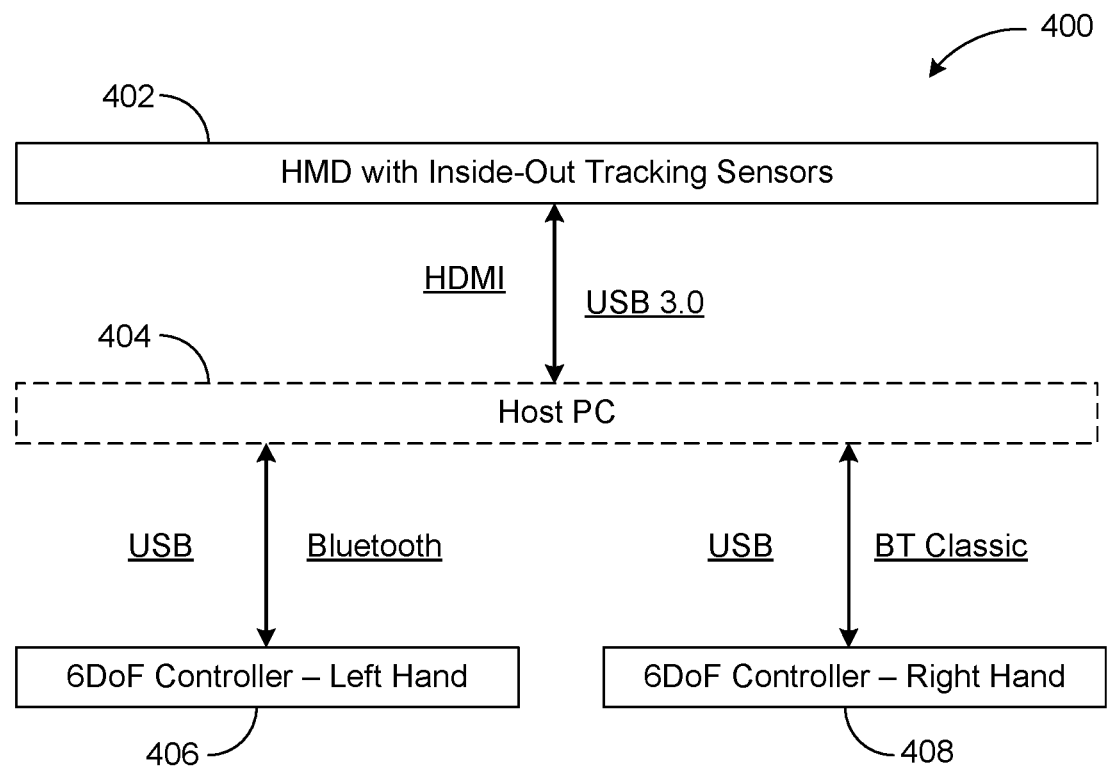
FIG. 4 shows an example computing system architecture for tracking a handheld object via a wearable device.

In some examples, the HMD 102 and handheld object 106 are configured to communicate with one another directly, such as via a wireless network connecting utilizing a Bluetooth communication protocol or other suitable wireless communication protocol. In other examples, an optional host computing device 110 may communicate with the HMD 102 and the handheld object 106 to receive data from HMD 102 and handheld objects (including image data acquired by the HMD and IMU data from the handheld objects), to process such data, and to send control signals to these devices. FIG. 4 shows an example computing system architecture 400 including an HMD 402 with tracking sensors, a host PC 404, a left handheld controller 406 and a right handheld controller 408, wherein each controller provides six degrees of freedom. Each of the left handheld controller 406 and the right handheld controller 408 is depicted as communicating with the host PC 404 via USB (Universal Serial Bus) and Bluetooth. In this example, different protocols may be used for different contexts. For example, the USB connection may be used for factory calibration while the Bluetooth may be used during ordinary device use. Similarly, the host PC 404 may communicate with the HMD 402 and/or the handheld controllers 406, 408 via any suitable wireless or wired communication protocol. Examples are illustrated as HDMI (High Definition Multimedia Interface) and USB.

As mentioned, host PC 404 is optional, and each of the handheld controllers 406 and 408 may communicate directly with the HMD 402 in some examples. It will be understood that while disclosed herein in the context of handheld controllers, any suitable handheld or movable object may be tracked, where such objects include a plurality of feature points that may take the form of light sources detectable as a constellation in image data. Likewise, the specific communication channels shown in FIG. 4 are presented for the purpose of example, and any other suitable communications channels, wired and/or wireless, may be used for HMD-to-host communication, host-to-handheld controller communication, and/or HMD-to-controller communication.

With reference again to the example of FIG. 1, a relative-to-HMD pose (position and orientation) of the handheld object 106 may be estimated by tracking the positions of light from the light sources on the handheld object 106 using the one or more cameras on the HMD 102. Data from the IMU on the handheld object 106 can further inform tracking, such as when some or all of the light sources might be occluded from view or outside the field of view 112, as discussed in more detail below regarding FIG. 8. The image data from the HMD camera(s) provides a pose of the handheld object 106 relative to the HMD 102, while the IMU senses the forces proportional to the change in position and orientation in its body frame relative to the inertial frame.

Figure 5:
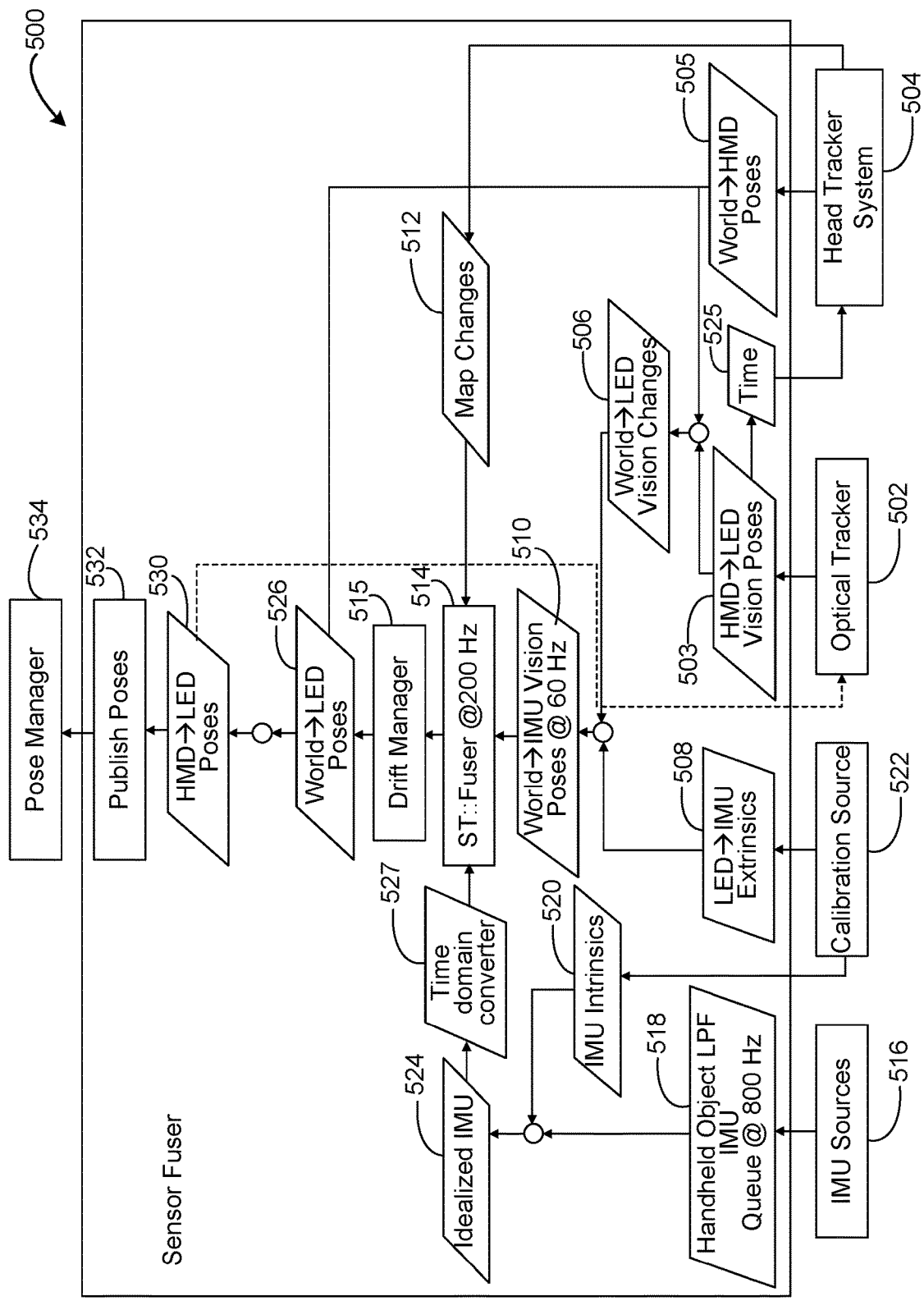
FIG. 5 shows an example processing system operable to derive the pose of a handheld object and HMD with respect to real world coordinates.

Thus, to combine the optical pose from image data with the IMU data to provide the actual pose of the handheld object 106 relative to the world, processing may be used to "fuse" the IMU data with the optical data by mapping the optical data to world coordinates. FIG. 5 shows a block diagram of an example processing system 500 that may be used to derive the pose of the handheld object and HMD with respect to real world coordinates from IMU data from the handheld object, and image and/or IMU data from the HMD. The processing system 500 may be implemented via any suitable hardware, including but not limited to the HMD, the handheld object, a host computing device in communication with the HMD and/or the handheld object, or distributed among multiple of these devices and/or other devices.

In the depicted system 500, the HMD receives image data capturing the surrounding environment and the handheld object(s) in the scene via an image sensing system comprising an image sensor located on the HMD. Image data used to track the surrounding environment is referred to herein as "environmental tracking exposures" and image data used to track handheld object(s) is referred to herein as "handheld object tracking exposures." Various example methods of acquiring these exposures are described in more detail below.

Where one or more handheld objects are visible to the image sensor, an optical tracker 502 of the HMD analyzes the image data and outputs data regarding the pose of the handheld object (or each handheld object, where multiple handheld objects are detected) with respect to the HMD ("HMD→LED Vision Poses" 503) by visually tracking the position and orientation of the handheld object per frame using the handheld object tracking exposures. Light sources may be identified in the image data, for example, by thresholding the image to find rough light source locations, and then fitting a statistical curve (e.g. a Gaussian function) to the thresholded images to locate the light source on a pixel or sub-pixel basis. Once the light sources in the image data are located, any suitable method may be used to determine the position and orientation of the handheld object, including but not limited to epipolar line fitting and rigid body transformation fitting based on the determined light source locations.

A head tracker system 504 provides a pose of the HMD relative to the world ("World→HMD Poses" at 505) by visually tracking the HMD relative to the background environment using the environmental tracking exposures. Any suitable method may be used to perform the environmental feature tracking. For example, environmental features may be tracked by performing image recognition on the environmental tracking exposures, e.g. to identify features such as edges in the image and then tracking changes in location of the features between environmental exposure frames.

The optical pose of the handheld object with respect to the HMD ("HMD→LED Vision Poses" at 503) and the optical pose of the HMD relative to the world ("World→HMD Poses" at 505) are used to determine a pose of the handheld object with respect to the world. The pose thus determined is also referred to as a 'visual pose" herein. This pose may be provided in the form of data representing changes in pose compared to a previous determination, as indicated at 506 ("World→LED Vision Changes"), or in any other suitable form. These data may be adjusted via extrinsic calibration data (illustrated as "LED→IMU Extrinsics" at 508) regarding the light sources and IMU of the handheld object to produce "World→IMU Vision Poses" at 510.

Optical pose data regarding the pose of the handheld object ("HMD→LED Vision Poses" at 503) and the pose of the HMD ("World→HMD Poses" at 505), both visually observed from the perspective of the HMD, are further provided to a fuser 514. The fuser 514 takes the optical pose data and "fuses" it with IMU data received from the handheld object to provide an actual pose of the handheld object with respect to the environment.

IMU data is received from IMU sources 516 on the handheld object. The IMU data may represent six degrees of freedom. Because accelerometers and gyroscopes may have random errors which have a flat frequency response that spans the whole bandwidth, a low pass filter (LPF) at 518 may be used to reduce such noise by removing the high frequency components that may not be used for the operation. Filtering may be performed remotely (e.g. via a host PC) or locally, and the data also may be downsampled. The resulting IMU data then may be adjusted via intrinsic calibration data 520 (illustrated as calibration source 522) previously stored for the handheld object. Example intrinsic calibration data 520 includes data regarding stereo camera offset and relative camera positions. Such calibration data may be updated during system use. The resulting "Idealized IMU" data 524 is provided to the fuser 514 for fusing with the image data from the head tracker system and the optical tracker.

The handheld object and the HMD operate in separate clock domains, and communications channels between them may experience lag and potentially inconsistent data rates. As such, to help relate the IMU data to a temporally corresponding visual tracking pose 510, a time domain converter 527 is used to align the time domains of the handheld object with that of the HMD.

Time information 525 regarding when optical poses were measured is provided to the head tracker system 504. The head tracker system 504 may give a most probable World-→HMD pose at the time of when a corresponding HMD→LED vision pose is obtained so that the discrete time moments regarding when HMD→LED Vision Poses 503 and World→HMD Poses 505 are evaluated are sufficiently coincident.

As the visual pose data for the handheld object that is input to the fuser is relative to the external environment, and as the IMU data from the handheld object is in its body frame relative to the inertial frame, the fuser 514 may fuse these data and output the handheld object pose with respect to the world, shown as "World→LED Poses" at 526. The fuser 514 may fuse these data in any suitable manner, such as via the use of a filter. In some examples, multiple Kalman filters may be used, each operating on discrete data at discrete time stamps, to help accommodate uncertainties with regard to correspondence in timing of the IMU data and the visual pose data. Additionally, a drift manager 515 may manage the state of the World→LED Poses generated by fuser 14. As described in more detail below, the drift manager 515 may determine whether and when to body-lock a pose of the handheld object to a body location on a user wearing the HMD, or to world-lock the pose of the handheld object.

A "Map Changes" process 512 may be utilized to track changes in head pose with respect to different tracking features within the world, and adjust mapping when the tracking features change (e.g. when a user moves between rooms). "Map Changes" may be performed by rebasing world coordinates on a new world coordinate system, or by mapping the new world coordinates back to the original world coordinate system. Such updates to the map may ensure that ongoing changes in the location of the HMD relative to the world are continually taken into account by the fuser 514.

The "World→HMD Poses" 526 output by the fuser may be used to derive a relation of the HMD to the handheld object, shown as "HMD→LED Poses" 530. "HMD→LED Poses" data 530 then may be resulting from the fuser 514 may also be sent as feedback to the optical tracker 502 for motion prediction purposes to help predict an expected pose of the controller in a next frame based upon HMD motion and the handheld object pose. Pose data further may be published at 532 and sent to a pose manager 534.

Figure 6:
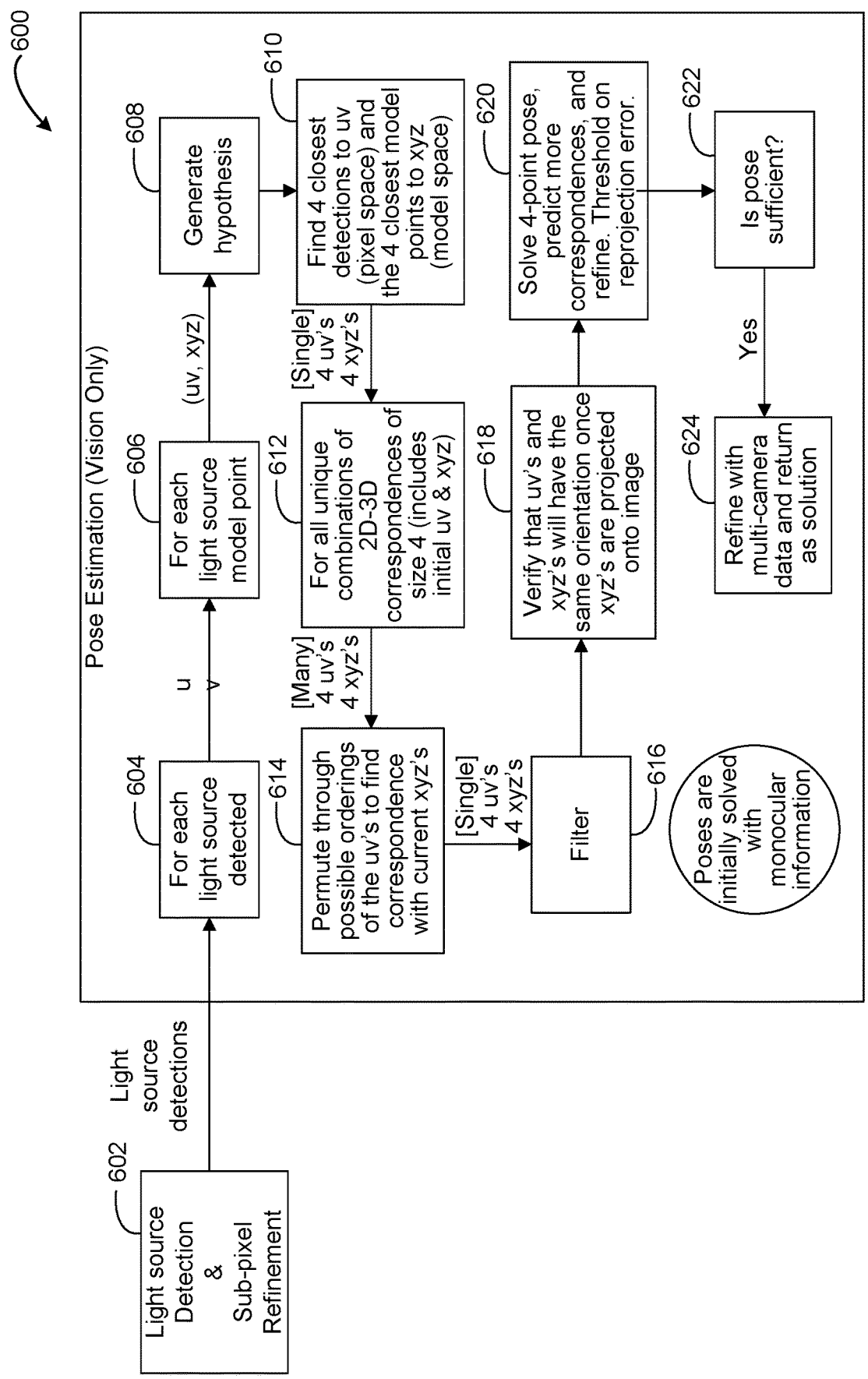
FIG. 6 shows a flow diagram illustrating an example method of estimating a pose of a handheld object.

FIG. 6 shows a flow diagram illustrating an example method 600 of estimating a pose of a handheld object. Method 600 may be performed, for example, by the optical tracker of an HMD, such as optical tracker 502 of FIG. 5, and may be performed separately for each camera of a stereo camera pair. Method 600 initially includes performing, at 602, light source detection and sub-pixel refinement. As mentioned above, light sources on the handheld object may be detected in handheld object tracking exposures of image data obtained from a camera. In each handheld object tracking exposure, multiple light sources may be detected. Each light source spot may cover multiple pixels. The relatively large size of the light spot may introduce uncertainty into the pose estimation. As such, a sub-pixel refinement may be performed to determine a most likely sub-pixel location for each light source in the image.

At 604, for each light source detected, a pixel location in the image for that light source is determined, represented by pixel coordinates u,v. Next, at 606, each two-dimensional u,v pixel may be mapped to a corresponding candidate three-dimensional data point x,y,z based on a three-dimensional coordinate frame system in space. At 608, the computing device may generate a hypothesis for the pose of the handheld object based on these light source correspondences. At 610, the computing device may determine four of the closest detections to the u,v pixel coordinates in pixel space and four of the closest model points to x,y,z in 3D model space. For unique combinations of 2D-3D correspondences of size 4 (referring to the four closest detections and model points), which includes the initial u,v and x,y,z coordinates (at 612), the computing device may permute through all possible orderings of the u,v's to find correspondence with x,y,z's, at 614. These possible orderings are then filtered, at 616, and further verified that u,v's and x,y,z's will have the same orientation once the x,y,z's are projected onto the image, at 618. At 620, the computing device solves for a 4-point pose, which refers to the pose (translation and rotation) obtained by evaluating a correspondence of size 4. The computing device further predicts more possible uv-xyz correspondences, and refines these predictions. The predictions are thresholded on a reprojection error, the error between 2D detection points (u,v's) and the prediction of associated 3D points (x,y,z), assuming a certain pose. At 622, the solution is evaluated to determine a likelihood of that solved pose as sufficiently matching the observed data. If the pose is determined to be sufficient, the computing device further refines the pose with multi-camera image data and returns the final pose as the solution, at 624. For example, because the HMD may have more than one camera, a pose may be solved for each camera on the HMD. Such refinement is performed as postprocessing of a multitude of poses obtained from different cameras. In other examples, any other suitable pose estimation process may be used.

Figure 7:
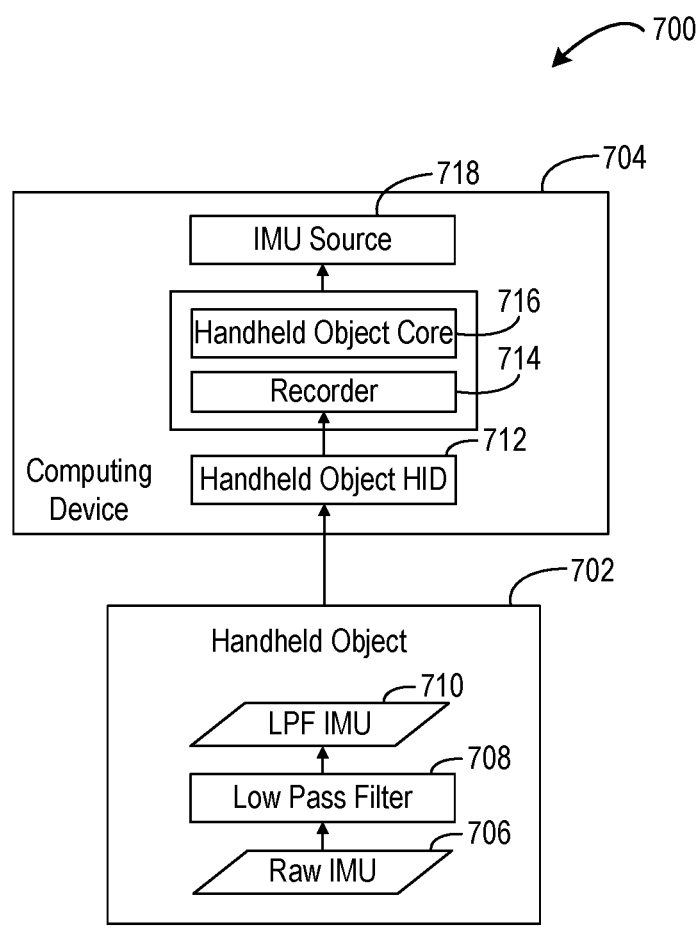
FIG. 7 illustrates an example of processing IMU data on a handheld object and on a host computing device.

FIG. 7 shows a flow diagram 700 illustrating example processing of IMU data on the handheld object 702 and on another computing device 704 to which the IMU data is sent, such as a host PC or HMD. IMU source 718 is an example of IMU sources 516 of FIG. 5. Raw IMU data 706 from the handheld object 702 is filtered using a low pass filter 708, as described above, and downsampled for sending to the other computing device 704. The low-pass-filtered IMU data 710 is received at a handheld object human interface device (HID) 712 of the computing device 704 and is further processed by a recorder 714 and handheld object core 716 to produce the data provided as IMU source 718.

As described above, the handheld object may use visible light LEDs to provide pose estimation using one or more visible light cameras on the HMD. In one example, a handheld object may have an arrangement of thirty-two visible light LEDs that may be actively illuminated for device tracking. Further, in some examples, two handheld objects may be utilized. In such examples, the light source arrangements for the two handheld objects may be the same, or may be different and non-symmetric to facilitate distinguishing the light patterns arising from each controller when both are visible in an image frame. The use of visible light sources and visible light cameras may help to avoid interference with foreign devices that may use infrared light, for example. Further, the use of visible light LEDs may allow the same visible light sensors used to image the surrounding environment for tracking the HMD pose to be leveraged for tracking the LED constellations.

As mentioned above, image data from the HMD may be used to track both a pose of the handheld object relative to the HMD and a pose of the HMD relative to the surrounding environment. However, different image data characteristics may be advantageous for these functions. For example, HMD pose is estimated using inside-out visible light camera sensors of the HMD (e.g. arranged as a stereo camera system) that track features detected in images of the environment, which may image the environment via ambient light. Thus, to acquire sufficiently detailed images for HMD pose tracking, it may be helpful to use relatively higher camera gain and longer exposure settings (on the order of milliseconds in some examples) to obtain images from which sufficient environmental features may be extracted.

On the other hand, the handheld object pose is determined by tracking light output by the plurality of light sources on the handheld object. As the light sources may have a relatively high intensity compared to ambient light used for the HMD tracking images, a shorter camera exposure (on the order of tens to hundreds of microseconds in some examples) may be used to detect the light sources against the background environment. In such images, the light sources may be detected as bright spots against a mostly black background in the shorter exposure image.

In some examples, a same image sensing system (e.g. a camera or stereo camera arrangement) may be used for both tracking functions by separating data from the image sensing system into separate virtual camera streams. For example, the image sensing system may be configured to interleave long exposure frames for environment tracking and short exposure frames for handheld object tracking to form exposure sequences, wherein an exposure sequence is a repeating pattern of environmental tracking exposures and handheld object tracking exposures. In some examples, the image sensing system also may be used to acquire a greater number of frames for handheld object tracking than for head tracking in an exposure sequence. For example, because the handheld object may change pose at a faster rate than the HMD, acquiring a greater number of frames for handheld object tracking than for head tracking may help to maintain tracking fidelity between image observations.

In some examples, acquiring the environmental tracking exposures comprises utilizing one or more of a longer exposure time and a higher gain for the handheld object tracking exposures. In one more specific example, a 120 Hz frame frequency camera may be used as a shared camera sensor in the HMD. In such a system, one example exposure sequence may comprise a 1:1 ratio of long and short exposure times in which one 60 Hz long (background) exposure is followed by a 60 Hz short (handheld object light source) exposure. Another example exposure sequence comprises a 1:2 ratio of a 30 Hz long exposure followed by two 60 Hz short exposures. As yet other example sequences, a 1:3 ratio of one long exposure followed by three short exposures may be used, or a 2:3 ratio (e.g. one long exposure, followed by one short exposure, followed by one long exposure, followed by two short exposures) may be used. In yet other examples, any other suitable exposure sequences may be used.

As noted above, in some examples at least a portion of the plurality of feature points on a handheld object may not be detected in another frame of the image data. For example, in FIG. 1 the handheld object 124 is outside the field of view 112 of the image sensing system of the HMD 102. In other examples, a portion of the light sources on the handheld object may be obscured or blocked from the imaging system of the HMD. Accordingly, the computing device may be unable to determine a visual pose of the handheld object via light output by the light sources. In these situations, IMU data from the IMU on the handheld object 124 may be used to further inform tracking. Double integration may be performed on acceleration of the handheld object 124, provided by the IMU data, to continue updating the pose of the handheld object 124 for short periods of time, such as 1-2 seconds.

However, using the IMU data alone to track the pose of a handheld object may become problematic over an extended time. For example, the IMU data may be noisy or have an acceleration bias, resulting in error between the actual position of the handheld object and a calculated position. Such error may grow quickly during double integration. As a result, the calculated position of the handheld object may drift rapidly away from the actual position of the handheld object, which may lead to an unrealistic user experience.

For example, a user of the handheld object may experience some residual velocity of the handheld object in some directions of motion. When the residual velocity is integrated to derive the position of the handheld object, drift may occur. The resulting drift may cause displayed virtual image(s) controlled by the handheld object to appear to wander away from the intended course or direction of movement.

Drift also may affect the user's perceived orientation of the handheld object. In one example, the user may be using the handheld object to control a ray pointer that displays a ray via the HMD in a direction governed by the handheld object's orientation. Even though the orientation of the handheld object may not be affected by drift, as will be discussed below, the calculated position of the handheld object serves as a starting point for the ray pointer. As the starting point for the ray pointer drifts away from the actual position of the handheld object, the ray pointer may appear to drift and point in a manner that the user does not intend.

One possible way to prevent such user experiences may be to simply hide handheld object output from display when the handheld object cannot be visually tracked, so that a pose of the handheld object may not be reported to the computing device and/or the HMD. Or, in other examples, the pose of the handheld object may be world-locked as soon as a visual pose is unavailable. For purposes of the present disclosure, "world-locked" means that the position of the handheld object is fixed relative to the real world. However, these approaches create other undesirable user experiences. For example, world-locking the position of the handheld object as soon as a visual pose is unavailable may be undesirable when the handheld object is just briefly out of view, such as when a user is executing a throwing motion with the handheld object. Additionally, in these approaches information about the current position of the handheld object may not be provided or may be incorrect.

Figure 8:
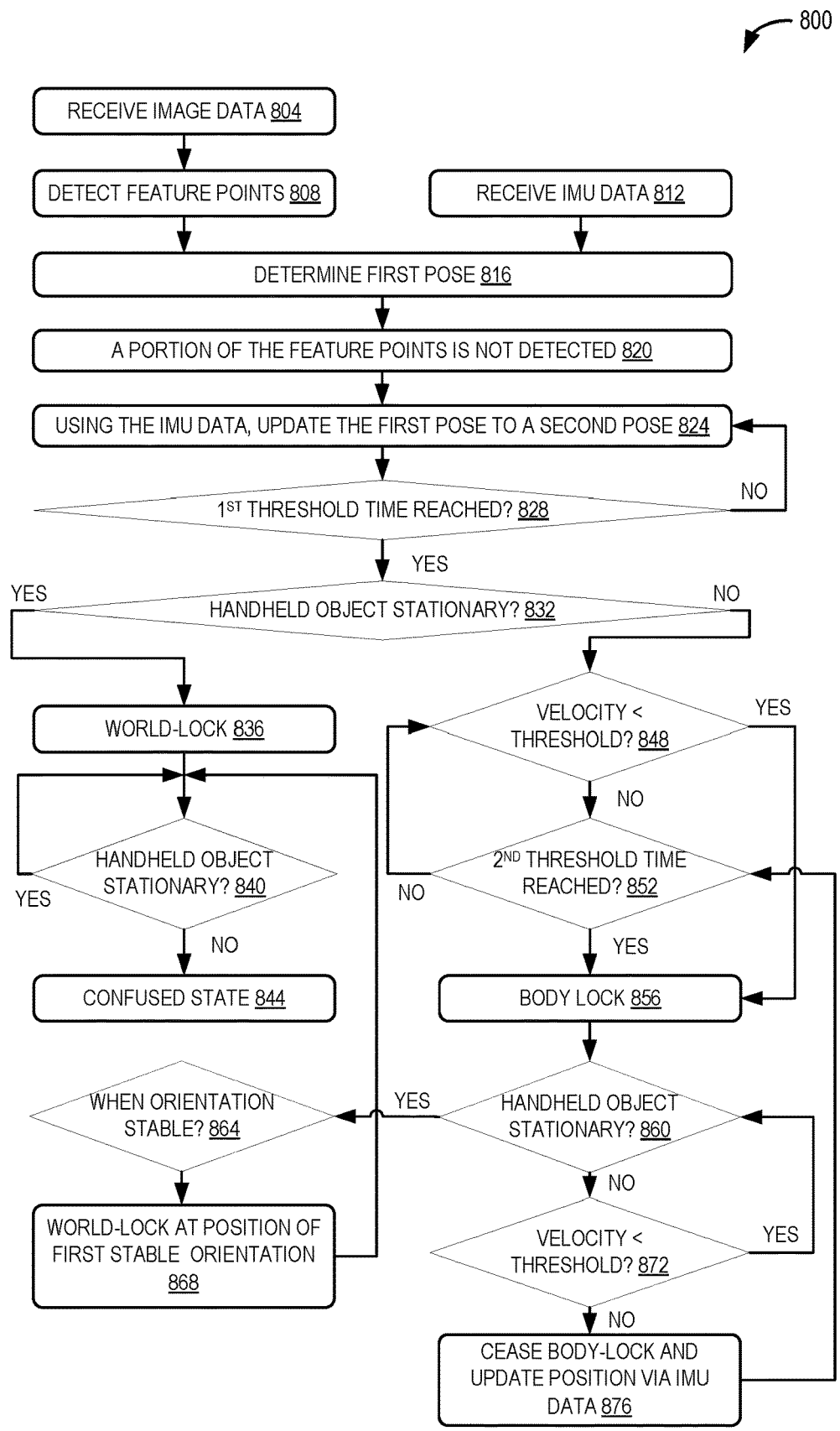
FIG. 8 shows a flow diagram illustrating an example method of tracking a pose of a handheld object.

Accordingly, systems and methods are disclosed herein that may facilitate extended tracking of the handheld object when at least a portion of the feature points of the handheld object are not detected, while also preventing unrealistic drift of the reported poses. An example of a method 800 for tracking a pose of a handheld object is illustrated in FIG. 8. One or more aspects of the method 800 may be performed by the drift manager 515 and/or other components and features of the processing system 500 described herein. At 804, the method 800 may include receiving image data from an image sensing system, which may be on a head-mounted display device as described above. At 808, the method 800 may include detecting a plurality of feature points of the handheld object in a frame of the image data. At 812, the method 800 may include receiving IMU data from an IMU of the handheld object. Based on detecting the plurality of feature points and receiving the IMU data, at 816 the method 800 may include determining a first pose of the handheld object. Determining the first pose of the handheld object may comprise performing sensor fusion of the image data and the IMU data, as previously described.

Next, at 820, the method 800 may include determining that at least a portion of the plurality of feature points is not detected in another frame of the image data. For example, and as described above, the handheld object may travel outside a field of view of the HMD's image sensing system. At this point, the drift manager 515 may determine how to treat the pose of the handheld object.

For example, at 824 the method 800 may include using solely the IMU data to update the first pose of the handheld object to a second pose. As described above, position, velocity and orientation estimates for the handheld object may be determined by performing integration on IMU data, such as acceleration and other data provided from one or more of an accelerometer, gyroscope and magnetometer of the handheld object. Therefore, when the handheld object may no longer be tracked using the image data, the IMU data may be used to calculate position until drift may become noticeable to a user of the handheld object.

In some examples, the drift manager 515 may monitor the time since the last visual pose of the handheld object was determined. Accordingly, at 828 the method 800 may include determining whether a first threshold time has been reached. The first threshold time may provide a brief window to minimize accumulation of position drift, while continuing to update the pose of the handheld object with any IMU data received. Beyond the first threshold time, position estimates of the handheld object may not be accurate enough for practical user interactions.

In some examples, the first threshold time may be 0.5 seconds since a last visual pose of the handheld object was detected in the image data. In other examples the first threshold time may be any suitable time, such as 0.3 secs, 0.7 secs, 1.0 sec, etc., and may depend on a variety of factors, such as computing device, handheld object and HMD capabilities, applications used with the handheld object, etc. For example, a poor-quality IMU that is not well-calibrated may provide noisier data, resulting in more drift over a given period, than a high-quality IMU that is calibrated more precisely. In this example, a shorter threshold time may be more suitable for the poor-quality IMU, and a longer threshold time may be suitable for the high-quality IMU.

As illustrated by the "NO" loop at step 828, the pose of the handheld object may be continuously updated using the IMU data until the first threshold time is reached. It also will be appreciated that if the handheld object returns to the field of view of the image sensing system at any point, and the image sensing system detects feature points sufficient to determine a visual pose of the handheld object, the method 800 may return to step 816 and determine a pose of the handheld object by fusing the image data and the IMU data as described above. In this manner, whenever image data is received that enables the determination of a visual pose, the pose of the handheld object may be updated to more accurately represent the six degrees of freedom of the handheld object.

However, if the handheld object cannot be visually tracked, and the first threshold time has been reached at 828, the method 800 may include, at 832, determining whether the handheld object is stationary. In some examples, determining whether the handheld object is stationary may comprise differentiating between a handheld object that is held in a user's hand and a handheld object resting on a surface in a steady state, such as on a table.

To differentiate between these examples, determining that the handheld object is stationary may comprise determining that the handheld object does not move or vibrate with more than a small amplitude for an extended time. For example, when the handheld object is held in the user's hand, it may move/vibrate more than when the handheld object is set down in a steady state. In some examples, determining that the handheld object is stationary may comprise determining that an angular velocity of the handheld object is less than approximately 0.1 radians per second for longer than approximately one second. In other examples, other velocities and corresponding timeframes may be utilized. If these conditions are met, the handheld object may be classified as stationary. In other examples, the handheld object may not immediately attain a steady state qualifying as stationary when set down by the user. These and other examples will be discussed in more detail below.

Figure 9:
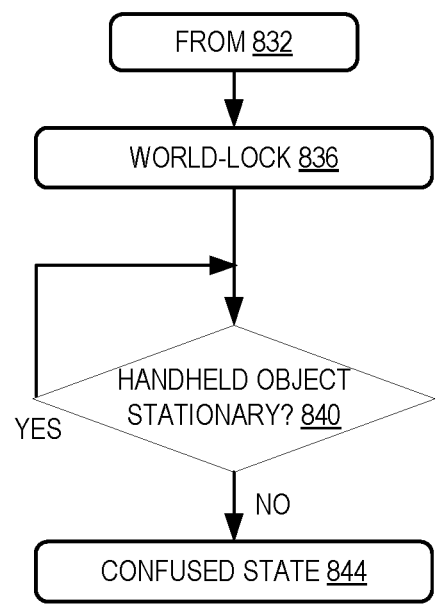
FIG. 9 illustrates a subset of the example method shown in FIG. 8 for a handheld object that may be stationary.

With reference now to FIG. 9, a subset of the example method 800 illustrated in FIG. 8 is depicted for a handheld object classified as stationary at step 832. Based on determining that the handheld object is stationary at step 832, at step 836 the method 800 may include world-locking the pose of the handheld object. In some examples, such as when a user has placed the handheld object on a surface, world-locking the position of the handheld object may make sense to the user, since the handheld object is stationary in the real world.

For example, the user may place the handheld object on a table and turn away, so that the handheld object leaves the field of view of the HMD image sensing system. In another example, the user may place the handheld object on a table and walk 2-3 meters away, beyond a distance where the feature points of the handheld object may be tracked in the image data. In these examples, the IMU data may indicate that the handheld object has not been moved since it was set down. Accordingly, the position of the handheld object on the table may be world-locked with confidence. In this manner, the method may facilitate a realistic user experience without visually tracking the handheld object.

After the handheld object has been world-locked, at 840 the method may then determine if the handheld object remains stationary. In some examples and as indicated by the YES branch from 840, the fuser may periodically determine if the handheld object is stationary until it is determined to be moving. As described above, determining whether the handheld object is stationary may comprise determining that the handheld object does not vibrate with more than a small amplitude for an extended time. In this manner, small impulses or vibrations may not trigger a premature determination that the handheld object is not stationary. The handheld object may remain stationary even if a person walking by or bumping into the table sends small vibrations through the handheld object. Even if these vibrations are large, they may be merely transitory and may not trigger a determination at 840 that the handheld object is not stationary.

In other examples, the orientation of the handheld object may be used to determine if the handheld object is stationary. For example, determining that the handheld object is not stationary may comprise determining, based on the IMU data, that the orientation of the handheld object has changed more than a threshold amount. In some examples, the threshold amount may be 10 degrees. In other examples, other orientation change thresholds may be utilized.

In other examples, a stationary handheld object may be moved while the handheld object remains out of the field of view of the HMD. For example, a handheld object resting on a table may fall or be knocked off the table. In other examples, the user may pick up the handheld object while looking in another direction such that the object is not in the field of view. In these examples where a previously stationary handheld object is later determined to be moving (i.e., not stationary), and the handheld object remains undetected by the image sensing system, it may not be possible to accurately determine an updated pose of the object. Therefore, and with reference to FIGS. 8 and 9, upon determining at 840 that the handheld object is not stationary, at 844 the method 800 may include setting the fuser to a confused state. In the confused state, the fuser may not update the position of the handheld object. In some examples, the position of the handheld object may be marked as invalid or not published or reported. In some examples and while in the confused state, IMU data may continue to be received and used to update an orientation of the pose of the handheld object.

In some examples, the handheld object may come back into the field of view of the HMD and additional feature points of the object may be detected by the image sensing system in one or more additional frames of the image data. For example, a user may deliberately pick up the handheld object for use, or a user may turn her head such that the field of view of the HMD moves to encompass the handheld object. In these examples, a visual pose now may be accurately determined by the fuser. Accordingly, the current pose may be updated to an updated pose by fusing the newly-acquired image data and the IMU data, and the method may return to step 816. It will be appreciated that the handheld object may come back into the field of view of the HMD at any point during the method 800.

With reference again to FIG. 8 and returning to step 832, in some examples the method 800 may include determining that the handheld object is not stationary. When the handheld object is not stationary, and a visual pose has not been received for the first threshold time, world-locking the handheld object may not provide a realistic or convenient user experience. For example, while playing a game a user may hold the handheld device while walking forward, ducking, kneeling or otherwise moving around during gameplay. If the pose of the handheld object is world-locked when a visual pose is not received for the first threshold time, this fixed world-locked position quickly becomes inaccurate as the user moves with the object in hand.

Accordingly, and as described in more detail below, when the handheld object is not stationary and a visual pose has not been received for the first threshold time, the pose of the handheld object may be body-locked to a body location on a user wearing the head-mounted display device. In this manner, and in one potential advantage of the present disclosure, the pose of the hand-held object may follow the user and track user movements while the object remains moving (i.e., non-stationary). For purposes of the present disclosure, "body-lock" means that the position of the handheld object is fixed relative to a body location on a user wearing the head-mounted display device. In some examples, the orientation of the handheld object may continue to be updated via IMU data when the pose of the handheld object is body-locked.

In some examples, a velocity of the hand-held object may be determined and used to body-lock the pose of the handheld object at different times. For example, when the handheld object is not stationary, the position of the handheld object may be updated differently based on whether the handheld object is moving with a fast velocity or a slow velocity. As noted above, when image data of the handheld object becomes unavailable, the position of the object may continue to be updated for a period of time using IMU data from the handheld object. In some examples, the velocity of the handheld object may be utilized to determine how long to continue updating the object's position using IMU data before body-locking the object's position.

Accordingly, at 848 the method 800 may include determining whether a velocity of the handheld object is less than a threshold velocity. In some examples, where the velocity is below the threshold velocity, a more realistic and pleasing user experience may be provided by body-locking the pose of the handheld object quickly after determining that the handheld object is not stationary at 832. Accordingly, if it is determined at 848 that the velocity of the handheld object is less than the threshold velocity, at 856 the method 800 may proceed to body-lock the handheld object without delay. In some examples, the threshold velocity may be 5 cm/s. Below this velocity and in as little as 1 or 1.5 seconds, the user may notice drift. Therefore, to minimize drift, the position of the handheld object may be body-locked upon determining that the velocity of the handheld object is less than 5 cm/s. In other examples, other threshold velocities may be utilized based upon on a variety of factors, such as computing device, handheld object and HMD capabilities, applications used with the handheld object, etc.

In one example, the user may be sitting on a couch and holding the handheld object in the user's lap while the user looks around the virtual world. In this example, the user may be looking in another direction and directing the field of view of the image sensing system away from the handheld object. The user may be using the handheld object to control a virtual laser pointer to point at and perhaps select other virtual elements displayed via the HMD. Although the handheld object may experience some small velocity and position changes from being held in the user's lap, publishing such position changes would cause the origin of the displayed laser pointer to drift. In this example, even a small amount of drift could negatively impact the user's experience. Therefore, in this example the position of the handheld object is body-locked upon determining that the velocity of the handheld object is less than the threshold velocity.

The velocity of the handheld object may be estimated using inertial data within the IMU data. Estimating the velocity of the handheld object may be less error-prone than estimating the position of the handheld object via IMU data, since obtaining velocity comprises single-integration of acceleration data, while obtaining position comprises double-integration. In this manner, the handheld object may continue to provide velocity information to determine if the handheld object is moving fast or slow relative to the threshold velocity.

In some examples, where the velocity of the handheld object is greater than or equal to the threshold velocity, a more realistic and pleasing user experience may be provided by waiting for a period of time before body-locking the pose of the handheld object. For example, the user may be attempting a fast motion with the handheld object, such as simulating a golf swing, throwing a snowball, playing tennis, etc. During such fast motions, the handheld object may travel outside the field of view of the HMD device. When performing such fast motions, it may be difficult for a user to perceive small variances or discrepancies in reported locations of the handheld object, such as if the position of the handheld object has drifted by 10 centimeters. Therefore, when the handheld object travels outside the field of view and fast motions are detected, a more realistic and pleasing user experience may be provided by continuing to update the position of the handheld object via IMU data for a certain period of time, rather than immediately body-locking the position of the handheld object to prevent drift.

As noted above, when updating the position of the handheld object using solely IMU data, eventually the position may drift by a noticeable amount. Accordingly, a second threshold time may be utilized to establish a window in which the IMU data may continue to be used to update the pose of the handheld object, with the duration of such threshold selected to keep the accumulation of position drift below a noticeable amount, such as 20 cm. Therefore, after determining at 848 that the velocity of the handheld object is greater than or equal to the threshold velocity, at 852 the method 800 may comprise determining whether a second threshold time has been reached.

In some examples, the second threshold time may be between 2.5 and 3 seconds after expiration of the first threshold time at 828. In other examples, other durations of the second threshold time may be utilized and may be based upon on a variety of factors, such as computing device, handheld object and HMD capabilities, applications used with the handheld object, etc. Where the second threshold time has not been reached, the method 800 may loop back to determining whether the velocity of the handheld object has slowed to less than the threshold velocity at 848.

Returning to 852, when the second threshold time is reached and to minimize drift, at 856 the method 800 may include body-locking the pose of the handheld object to a body location on the user wearing the head-mounted display device. In this manner and as described above, the position of the hand-held object may then follow the user and track user movements while the object remains moving (i.e., non-stationary).

In some examples, body-locking the handheld object to parts of the user's body that may be prone to large or frequent movements may detract from the user's experience. For example, if the handheld object is body-locked to a location within or on the user's head, the position of the handheld object may change whenever the user's head turns or otherwise moves, regardless of the user's intention to move the handheld object. Accordingly, in some examples and in one potential advantage of the present disclosure, body-locking the handheld object may comprise locking the pose of the handheld object to the user's neck or elbow. For example, the position of the handheld object may be body-locked to a location on or within the user's neck. When a person moves or turns her head, the person's neck generally does not move or moves just slightly. Accordingly, by body-locking the handheld object to the user's neck, the user's head may turn and move without moving or with only slightly moving a reported position of the handheld object. In this manner, the body-locked position of the handheld object may still closely track a position of the user's body without undesired updates for head movement alone. For example, the user may walk, lean forward, duck or kneel with the handheld object, and the reported pose of the handheld object may move along with the user.

In other examples, body-locking the handheld object may comprise locking the pose of the handheld object to the user's elbow. Accordingly, motion of the handheld object may closely track motion of the user's arm. This may provide the user with a more realistic experience, such as in some gaming examples as described above.

As noted above, the orientation of the handheld object may continue to be updated via IMU data when the pose of the handheld object is body-locked. For example, gyro sensors within the IMU may provide rotational velocity in the IMU data. Single-integration of the rotational velocity may provide the actual orientation of the handheld object with minimal error. Therefore, body-locking or world-locking the pose of the handheld object may comprise locking the position and not locking the orientation of the handheld object. In this manner, some interactive aspects of the pose of the handheld object may be preserved while the pose is body-locked.

For example, an application controlled by the handheld object may use orientation information but not position information from the handheld object. In one example, the user may direct a pointer, such as a simulated laser pointer or a cursor, around the virtual world. In this example, the user may rotate the handheld object while holding it in a relatively fixed position. Therefore, the position of the handheld object may be body-locked without a noticeable change in the functionality of the application observed by the user.

In some examples, after body-locking the position of the handheld object at 856, the handheld object may become stationary. Accordingly, at 860, the method 800 may include determining whether the handheld object is stationary. As with step 840, a loop may be implemented at step 860 to continuously check whether the handheld object is stationary.

In examples where the handheld object is not stationary at 860 (i.e., the handheld object is body-locked and moving), the method 800 may include, at 872, determining whether the velocity of the handheld object is less than a threshold velocity. The threshold velocity at 872 may be the same threshold velocity as in step 848 or may be any other suitable threshold velocity. If the velocity of the handheld object is less than the threshold velocity, the method 800 may loop back to step 860 to continuously check whether the handheld object is stationary. It will be appreciated that the handheld object may remain body-locked at steps 860 and 872.

In another example, where the handheld object is not stationary and its velocity is determined to be greater than or equal to the threshold velocity at 872, the method 800 may include, at 876, ceasing to body-lock the position of the handheld object and updating its position via the IMU data. In one example, a user may begin another throwing motion using the body-locked handheld object, which motion may be classified as a fast motion if the velocity of the handheld object is greater than the threshold velocity. In this example, the handheld object may exit the body-locked state and the position of the handheld object may be updated again using the IMU data until the second threshold time is reached at step 852.

With reference again to step 832, in some examples after the first threshold time has been reached, a handheld object may be incorrectly classified as not stationary. For example, in different scenarios it may not be possible to determine that a stationary handheld object is stationary immediately after the first threshold time is reached at 828. In one example, a user may drop the handheld object onto a table in such a manner that the handheld object vibrates with a large amplitude when it contacts the table, and such vibrations continue and dissipate over time. In this example, at 832 the handheld object may not be recognized as stationary right away. For example, it may take 2-3 seconds after the handheld object is dropped to dampen the vibrations of the object. Until then, the amplitude of the vibrations may remain above a threshold for determining that the handheld object is stationary.

Figure 10:
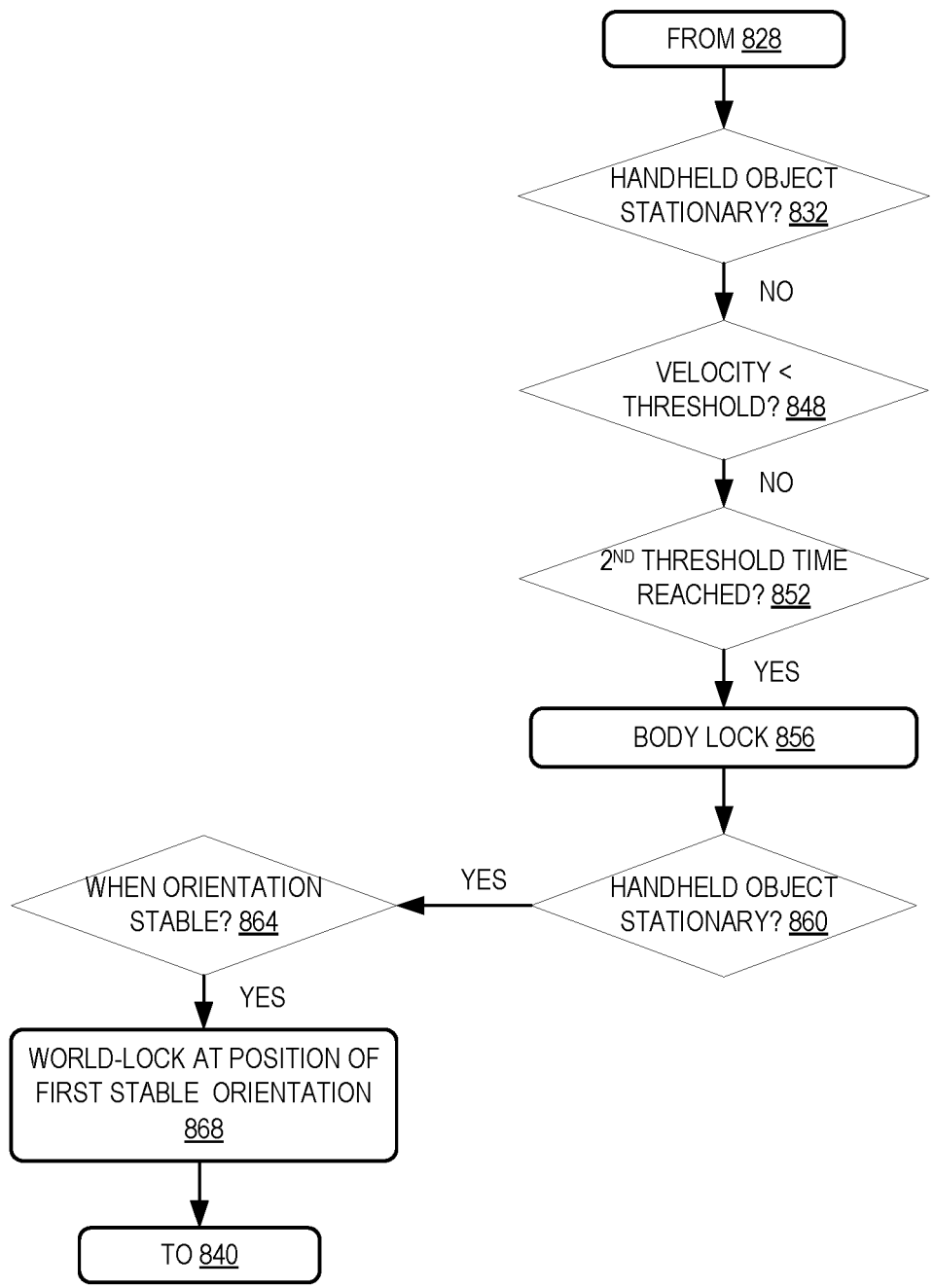
FIG. 10 illustrates a subset of the example method shown in FIG. 8 for world-locking a handheld object to an earlier position.

With reference now to FIG. 10, an example subset of steps of method 800 are illustrated that may be performed where the handheld object is not immediately determined to be stationary. At 832, the handheld object is determined to not be stationary. At 848, the velocity of the handheld object is determined to be greater than or equal to the threshold velocity. For example, the handheld object still may be vibrating after being dropped. As a result, a position of the handheld object may continue to be updated using the IMU data (as opposed to immediately body-locking the position as described above).

In this example, the velocity of the handheld object remains greater than the threshold velocity until the second threshold time is reached at 852. Based on the second threshold time being reached, at 856 the pose of the handheld object is body-locked to a body location on the user wearing the head-mounted display device. As noted above, after the handheld object is body-locked at 856, at 860 the method 800 again determines whether the object is stationary. In this example and at some point after the handheld object is dropped on the table, the vibrations of the object fall below level associated with the object being stationary. Accordingly, at 860 the handheld object is determined to be stationary.

At this point, it would be desirable to change the pose of the handheld object from body-locked to world-locked at the object's current, actual position in the real world. In the example above, there is a delay between the time when the position of the handheld object on the table is fixed and the time when it is determined that the object is stationary. During this interval, in some examples the position of the handheld object may continue to be updated via double integration of IMU data, despite the fact that the actual position of the object in the real world remained unchanged. It will also be appreciated that the orientation of the handheld object remained fixed after the time the object came to rest on the table. Accordingly and in some examples, a log of prior orientations of the handheld object may be checked to determine if the position of the handheld object actually may have been fixed at an earlier time, such as after the first threshold time was reached and before a current time.

In one example of determining that the handheld object was actually stationary before the current time, at 864 the method 800 may include determining when the orientation of the handheld object became stable (i.e., stopped changing). For example, the previous orientations of the handheld object may be tracked using the IMU data to pinpoint the time when the handheld object was originally set down by the user (and orientations ceased changing). After determining that the orientation has been stable since a given time, at 868 the method 800 may comprise world-locking the pose of the handheld object at the position of the handheld object at the given time. For example, based on determining that the orientation stopped changing prior to updating the first pose to the second pose, the position of the handheld object may be world-locked at a position of the first pose. In this manner, the pose of the handheld object may be corrected to account for being stable at an earlier time, and may be world-locked at this updated position. The method may then proceed to 840 as described above.

In some examples, the methods and processes described herein may be tied to a computing system of one or more computing devices, such as a head-mounted device or a host computer. In particular, such methods and processes may be implemented as a computer-application program or service, an application-programming interface (API), a library, and/or other computer-program product.

Figure 11:
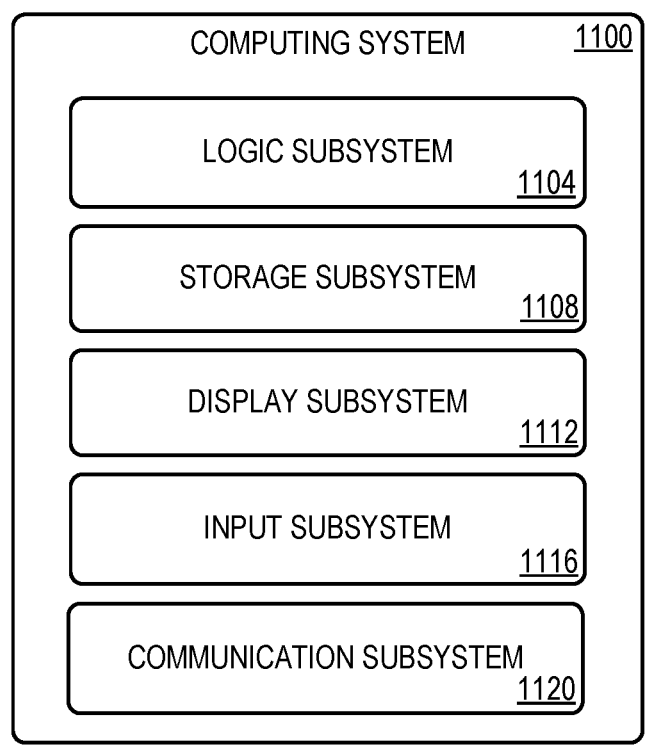
FIG. 11 is a block diagram showing an example computing system.

FIG. 11 schematically shows a non-limiting embodiment of a computing system 1100 that can enact one or more of the methods and processes described above. Computing system 1100 is shown in simplified form. Computing system 1100 may take the form of one or more personal computers, server computers, tablet computers, home-entertainment computers, network computing devices, gaming devices, mobile computing devices, mobile communication devices (e.g. a smart phone), and/or other computing devices, such as head-mounted display devices 102 and 200, handheld objects 106 and 124, and host computing device 110.

Computing system 1100 includes a logic subsystem 1104 and a storage subsystem 1108. Computing system 1100 may optionally include a display subsystem 1112, input subsystem 1116, communication subsystem 1120, and/or other components not shown in FIG. 11.

Logic subsystem 1104 includes one or more physical devices configured to execute instructions. For example, logic subsystem 1104 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem 1104 may include one or more processors configured to execute software instructions. Additionally or alternatively, logic subsystem 1104 may include one or more hardware or firmware logic machines configured to execute hardware or firmware instructions. Processors of logic subsystem 1104 may be single-core or multi-core, and the instructions executed thereon may be configured for sequential, parallel, and/or distributed processing. Individual components of logic subsystem 1104 optionally may be distributed among two or more separate devices, which may be remotely located and/or configured for coordinated processing. Aspects of logic subsystem 1104 may be virtualized and executed by remotely accessible, networked computing devices configured in a cloud-computing configuration.

Storage subsystem 1108 includes one or more physical devices configured to hold instructions executable by logic subsystem 1104 to implement the methods and processes described herein. When such methods and processes are implemented, the state of storage subsystem 1108 may be transformed—e.g., to hold different data.

Storage subsystem 1108 may include removable and/or built-in devices. Storage subsystem 1108 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 1108 may include volatile, nonvolatile, dynamic, static, read/write, read-only, random-access, sequential-access, location-addressable, file-addressable, and/or content-addressable devices.

It will be appreciated that storage subsystem 1108 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 1104 and storage subsystem 1108 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 1112 may be used to present a visual representation of data held by storage subsystem 1108. This visual representation may take the form of virtual and/or augmented reality imagery, such as holograms. As the herein described methods and processes change the data held by the storage machine, and thus transform the state of the storage machine, the state of display subsystem 1112 may likewise be transformed to visually represent changes in the underlying data. Display subsystem 1112 may include one or more display devices utilizing virtually any type of technology. Such display devices may be combined with logic subsystem 1104 and/or storage subsystem 1108 in a shared enclosure, or such display devices may be peripheral display devices.

When included, input subsystem 1116 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1120 may be configured to communicatively couple computing system 1100 with one or more other computing devices. Communication subsystem 1120 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1100 to send and/or receive messages to and/or from other devices via a network such as the Internet.

The following paragraphs provide additional support for the claims of the subject application. One aspect provides, at a computing device, a method for tracking a pose of a handheld object used with a head-mounted display device, the method comprising receiving image data from an image sensing system, detecting a plurality of feature points of the handheld object in a frame of the image data, receiving inertial measurement unit (IMU) data from an IMU of the handheld object, based on detecting the plurality of feature points and receiving the IMU data, determining a first pose of the handheld object, determining that at least a portion of the plurality of feature points is not detected in another frame of the image data, using the IMU data, updating the first pose of the handheld object to a second pose, and body-locking the second pose of the handheld object to a body location on a user wearing the head-mounted display device.

The method may additionally or alternatively include, wherein body-locking the second pose of the handheld object further comprises determining that a first threshold time has been reached, determining that the handheld object is not stationary, and based on determining that the first threshold time has been reached and that the handheld object is not stationary, body-locking the second pose of the handheld object to the body location on the user wearing the head-mounted display device. The method may additionally or alternatively include, determining that a second threshold time has been reached after expiration of the first threshold time, and based on determining that the first threshold time has been reached, the handheld object is not stationary, and the second threshold time has been reached, body-locking the second pose of the handheld object to the body location on the user wearing the head-mounted display device.

The method may additionally or alternatively include, determining that the handheld object is stationary after determining that the handheld object is not stationary, and based on determining that the handheld object is stationary after determining that the handheld object is not stationary, using the IMU data to update an orientation of the second pose of the handheld object, and marking a position of the second pose as invalid.

The method may additionally or alternatively include, prior to body-locking the second pose of the handheld object, determining that a velocity of the handheld object is less than a threshold velocity, and based on determining that the velocity of the handheld object is less than the threshold velocity, body-locking the second pose of the handheld object to the body location on the user wearing the head-mounted display device. The method may additionally or alternatively include, determining that the handheld object is stationary, and based on determining that the handheld object is stationary, world-locking the second pose of the handheld object. The method may additionally or alternatively include, wherein the body location on the user wearing the head-mounted display device comprises a neck or an elbow of the user.

The method may additionally or alternatively include, detecting additional feature points in one or more additional frames of the image data, and based on detecting the additional feature points, ceasing to body-lock the second pose of the handheld object and updating the second pose to a third pose. The method may additionally or alternatively include, wherein the pose of the handheld object comprises a position and an orientation, and body-locking the second pose of the handheld object comprises locking the position and not locking the orientation. The method may additionally or alternatively include, wherein the image sensing system is mounted on the head-mounted display device.

Another aspect provides a computing device for tracking a pose of a handheld object used with a head-mounted display device, the computing device comprising a logic device configured to execute instructions, and a storage device comprising instructions executable by the logic device to receive image data from an image sensing system, detect a plurality of feature points of the handheld object in a frame of the image data, receive inertial measurement unit (IMU) data from an IMU of the handheld object, based on detecting the plurality of feature points and receiving the IMU data, determine a first pose of the handheld object, determine that at least a portion of the plurality of feature points is not detected in another frame of the image data, using the IMU data, update the first pose of the handheld object to a second pose, and body-lock the second pose of the handheld object to a body location on a user wearing the head-mounted display device.

The computing device may additionally or alternatively include, wherein the instructions are executable to determine that a first threshold time has been reached, determine that the handheld object is not stationary, and based on determining that the first threshold time has been reached and that the handheld object is not stationary, body-lock the second pose of the handheld object to the body location on the user wearing the head-mounted display device. The computing device may additionally or alternatively include, wherein the instructions are executable to determine that a second threshold time has been reached after expiration of the first threshold time, and based on determining that the first threshold time has been reached, the handheld object is not stationary, and the second threshold time has been reached, body-lock the second pose of the handheld object to the body location on the user wearing the head-mounted display device.

The computing device may additionally or alternatively include, wherein the instructions are executable to determine that the handheld object is stationary after determining that the handheld object is not stationary, and based on determining that the handheld object is stationary after determining that the handheld object is not stationary, use the IMU data to update an orientation of the second pose of the handheld object, and marking a position of the second pose as invalid. The computing device may additionally or alternatively include, wherein the instructions are executable to, prior to body-locking the second pose of the handheld object, determine that a velocity of the handheld object is less than a threshold velocity, and based on determining that the velocity of the handheld object is less than the threshold velocity, body-lock the second pose of the handheld object to the body location on the user wearing the head-mounted display device.

The computing device may additionally or alternatively include, wherein the instructions are executable to determine that the handheld object is stationary, and based on determining that the handheld object is stationary, world-lock the second pose of the handheld object. The computing device may additionally or alternatively include, wherein the body location on the user wearing the head-mounted display device comprises a neck or an elbow of the user. The computing device may additionally or alternatively include, wherein the instructions are executable to detect additional feature points in one or more additional frames of the image data, and based on detecting the additional feature points in the image data, cease body-locking the second pose of the handheld object and update the second pose to a third pose. The computing device may additionally or alternatively include, wherein the pose of the handheld object comprises a position and an orientation, and body-locking the second pose of the handheld object comprises locking the position and not locking the orientation Another aspect provides a head-mounted display device, comprising: an image sensing system, a computing device comprising a logic device configured to execute instructions, and a storage device comprising instructions executable by the logic device to receive image data from the image sensing system, detect a plurality of feature points of the handheld object in a frame of the image data, receive inertial measurement unit (IMU) data from an IMU of the handheld object, based on detecting the plurality of feature points and receiving the IMU data, determine a first pose of the handheld object, determine that at least a portion of the plurality of feature points is not detected in another frame of the image data, using the IMU data, update the first pose of the handheld object to a second pose, determine that the handheld object is not stationary, determine that a first threshold time has been reached, and based on determining that the first threshold time has been reached and that the handheld object is not stationary, body-lock the second pose of the handheld object to a body location on a user wearing the head-mounted display device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. At a computing device, a method for tracking a pose of a handheld object used with a head-mounted display device, the method comprising:
   receiving image data from an image sensing system;
   detecting a plurality of feature points of the handheld object in a frame of the image data, wherein the feature points comprise light sources and/or other fiducial markers;
   receiving inertial measurement unit (IMU) data from an IMU of the handheld object;

based on detecting the plurality of feature points and receiving the IMU data, determining a first pose of the handheld object;

determining that at least a portion of the plurality of feature points is not detected in another frame of the image data;

based on determining that at least the portion of the plurality of feature points is not detected, using solely the IMU data, updating the first pose of the handheld object to a second pose; and body-locking the second pose of the handheld object to a body location on a user wearing the head-mounted display device.

2. The method of claim 1, wherein body-locking the second pose of the handheld object further comprises:

determining that a first threshold time has been reached;

determining that the handheld object is not stationary; and based on determining that the first threshold time has been reached and that the handheld object is not stationary, body-locking the second pose of the handheld object to the body location on the user wearing the head-mounted display device.

3. The method of claim 2, further comprising:

determining that a second threshold time has been reached after expiration of the first threshold time; and based on determining that the first threshold time has been reached, the handheld object is not stationary, and the second threshold time has been reached, body-locking the second pose of the handheld object to the body location on the user wearing the head-mounted display device.

4. The method of claim 2, further comprising:

determining that the handheld object is stationary after determining that the handheld object is not stationary; and based on determining that the handheld object is stationary after determining that the handheld object is not stationary, using the IMU data to update an orientation of the second pose of the handheld object, and marking a position of the second pose as invalid.

5. The method of claim 1, further comprising:

prior to body-locking the second pose of the handheld object, determining that a velocity of the handheld object is less than a threshold velocity; and based on determining that the velocity of the handheld object is less than the threshold velocity, body-locking the second pose of the handheld object to the body location on the user wearing the head-mounted display device.

6. The method of claim 1, further comprising:

determining that the handheld object is stationary; and based on determining that the handheld object is stationary, world-locking the second pose of the handheld object.

7. The method of claim 1, wherein the body location on the user wearing the head-mounted display device comprises a neck or an elbow of the user.

8. The method of claim 1, further comprising detecting additional feature points in one or more additional frames of the image data; and based on detecting the additional feature points, ceasing to body-lock the second pose of the handheld object and updating the second pose to a third pose.

9. The method of claim 1, wherein the pose of the handheld object comprises a position and an orientation, and body-locking the second pose of the handheld object comprises locking the position and not locking the orientation.

10. The method of claim 1, wherein the image sensing system is mounted on the head-mounted display device.

11. A computing device for tracking a pose of a handheld object used with a head-mounted display device, the computing device comprising:

a logic device configured to execute instructions; and a storage device comprising instructions executable by the logic device to:

receive image data from an image sensing system;

detect a plurality of feature points of the handheld object in a frame of the image data, wherein the feature points comprise light sources and/or other fiducial markers;

receive inertial measurement unit (IMU) data from an IMU of the handheld object;

based on detecting the plurality of feature points and receiving the IMU data, determine a first pose of the handheld object;

determine that at least a portion of the plurality of feature points is not detected in another frame of the image data;

based on determining that at least the portion of the plurality of feature points is not detected, using solely the IMU data, update the first pose of the handheld object to a second pose; and body-lock the second pose of the handheld object to a body location on a user wearing the head-mounted display device.

12. The computing device of claim 11, wherein the instructions are executable to:

determine that a first threshold time has been reached;

determine that the handheld object is not stationary; and based on determining that the first threshold time has been reached and that the handheld object is not stationary, body-lock the second pose of the handheld object to the body location on the user wearing the head-mounted display device.

13. The computing device of claim 12, wherein the instructions are executable to:

determine that a second threshold time has been reached after expiration of the first threshold time; and based on determining that the first threshold time has been reached, the handheld object is not stationary, and the second threshold time has been reached, body-lock the second pose of the handheld object to the body location on the user wearing the head-mounted display device.

14. The computing device of claim 12, wherein the instructions are executable to:

determine that the handheld object is stationary after determining that the handheld object is not stationary; and based on determining that the handheld object is stationary after determining that the handheld object is not stationary, use the IMU data to update an orientation of the second pose of the handheld object, and marking a position of the second pose as invalid.

15. The computing device of claim 11, wherein the instructions are executable to:

prior to body-locking the second pose of the handheld object, determine that a velocity of the handheld object is less than a threshold velocity; and based on determining that the velocity of the handheld object is less than the threshold velocity, body-lock the second pose of the handheld object to the body location on the user wearing the head-mounted display device.

16. The computing device of claim 11, wherein the instructions are executable to:

determine that the handheld object is stationary; and
based on determining that the handheld object is stationary, world-lock the second pose of the handheld object.

17. The computing device of claim 11, wherein the body location on the user wearing the head-mounted display device comprises a neck or an elbow of the user.

18. The computing device of claim 11, wherein the instructions are executable to:
detect additional feature points in one or more additional frames of the image data; and
based on detecting the additional feature points in the image data, cease body-locking the second pose of the handheld object and update the second pose to a third pose.

19. The computing device of claim 11, wherein the pose of the handheld object comprises a position and an orientation, and body-locking the second pose of the handheld object comprises locking the position and not locking the orientation.

20. A head-mounted display device, comprising:
an image sensing system; and
a computing device comprising:
a logic device configured to execute instructions; and
a storage device comprising instructions executable by the logic device to:
receive image data from the image sensing system;
detect a plurality of feature points of the handheld object in a frame of the image data;
receive inertial measurement unit (IMU) data from an IMU of the handheld object;
based on detecting the plurality of feature points and receiving the IMU data, determine a first pose of the handheld object;
determine that at least a portion of the plurality of feature points is not detected in another frame of the image data;
using the IMU data, update the first pose of the handheld object to a second pose;
determine that the handheld object is not stationary;
determine that a first threshold time has been reached; and
based on determining that the first threshold time has been reached and that the handheld object is not stationary, body-lock the second pose of the handheld object to a body location on a user wearing the head-mounted display device.

* * * * *